(12) United States Patent
Kinoshita et al.

(10) Patent No.: US 9,417,663 B2
(45) Date of Patent: Aug. 16, 2016

(54) ELECTRONIC DEVICE WITH ROTATABLE DISPLAY AND KEYBOARD

(71) Applicant: Lenovo (Singapore) Pte. Ltd., Singapore (SG)

(72) Inventors: Hiroaki Kinoshita, Kanagawa-ken (JP); Eiji Shinohara, Kanagawa-ken (JP); Seita Horikoshi, Kanagawa-ken (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 37 days.

(21) Appl. No.: 14/299,683

(22) Filed: Jun. 9, 2014

(65) Prior Publication Data

US 2014/0362507 A1    Dec. 11, 2014

(30) Foreign Application Priority Data

Jun. 10, 2013  (JP) ................. 2013-121857

(51) Int. Cl.
*H05K 5/00*  (2006.01)
*G06F 1/16*  (2006.01)
*E05D 11/00*  (2006.01)

(52) U.S. Cl.
CPC .............. *G06F 1/1681* (2013.01); *E05D 11/00* (2013.01); *G06F 1/166* (2013.01); *E05Y 2900/606* (2013.01); *Y10T 16/551* (2015.01)

(58) Field of Classification Search
CPC ... G06F 1/1616; G06F 1/1618; G06F 1/1656; H05K 1/028
See application file for complete search history.

(56) References Cited

U.S. PATENT DOCUMENTS

2013/0111704 A1*  5/2013  Mitsui ............... H04M 1/022
                                                     16/250
2013/0249360 A1*  9/2013  Guo ................. G06F 1/1681
                                                     312/223.2

FOREIGN PATENT DOCUMENTS

JP        07084677 A    3/1995
JP     2004227420 A   12/2004
JP     2008269412 A    6/2008

* cited by examiner

*Primary Examiner* — Robert J Hoffberg
*Assistant Examiner* — Hung Dang
(74) *Attorney, Agent, or Firm* — Ference & Associates LLC

(57) ABSTRACT

An electronic device capable of maintaining a high level of operability and which prevents damage to the keyboard and other input systems when converted from a laptop PC to a tablet PC. The electronic device includes a main body part having a keyboard and a display part having a display. The main body part and the display part may rotate from a 0-degree position where the display and the keyboard face each other up to a 360-degree position where the back faces of the display and the keyboard face each other through a 180-degree position where the display and the keyboard are parallel with each other while facing the same direction. The electronic device includes an upper leg portion that can advance and retreat from an upper face of the main body part in response to rotational movement of the display part from the 180-degree position to the 360-degree position.

13 Claims, 8 Drawing Sheets

ELECTRONIC DEVICE WITH ROTATABLE DISPLAY AND KEYBOARD

CLAIM FOR PRIORITY

This application claims priority from Japanese Patent Application No. 2013-121857, filed on Jun. 10, 2013, and which is fully incorporated by reference as if set forth herein.

BACKGROUND

In recent years, a tablet personal computer (tablet PC) having a touch panel type liquid crystal display without a physical keyboard has become increasingly popular. The tablet PC is easy to operate because it is simple to carry and the user can input information by using the touch panel. Since a tablet PC does not have a physical keyboard, however, it may be difficult and time-consuming to type in long sentences.

A convertible tablet personal computer (convertible PC) is capable of rotating the display portion 360 degrees and folding said display portion back over the keyboard. Since the convertible PC can be used in two ways, as a normal laptop personal computer (laptop PC) and a tablet PC, user convenience is very high. When such a convertible PC is changed to a tablet PC, the upward-facing keyboard in laptop PC mode becomes the downward-facing portion in tablet PC mode. Therefore, when the tablet PC is placed on a desk or other similar surface, the keyboard and click pad come into direct contact with the hard surface of the desk. Consequently, this decreases the stability of the device and also increases the likelihood of scratching or damaging the keyboard and click pad.

BRIEF SUMMARY

One aspect provides an electronic device comprising: a main body part having an upper face and a lower face, the upper face comprising: a keyboard; a display part having a display; a hinge mechanism connecting said main body part to said display part; said main body part and said display part configured to rotate from a 0-degree position where said display and said keyboard face each other to a 360-degree position where back faces of said display and said keyboard face each other through a 180-degree position where said display and said keyboard are parallel with each other while facing an identical direction; and a leg portion that protrudes/retracts from said upper face or said lower face of said main body part in response to rotational movement of said display part from the 180-degree position to the 360-degree position relative to said main body part.

Another aspect provides a hinge mechanism comprising: a hinge case; a link pin; a biaxial structure containing a first and second shaft; and a protruding stopper piece.

A further aspect provides a method comprising: operating an electronic device to: provide structural stability and protection from structural damage; responsive to rotation of the display part in relation to the main body part from the 0-degree position to the 360-degree position, leg portions automatically retract or protrude from the upper or lower faces of the main body part.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the claims, but is merely representative of example embodiments.

Reference throughout this specification to "one embodiment" or "an embodiment" means that a particular feature, structure, or characteristic described in connection with the embodiment is included in at least one embodiment. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of example embodiments. One skilled in the relevant art will recognize, however, that aspects can be practiced without one or more of the specific details, or with other methods, components, materials, et cetera. In other instances, well-known structures, materials, or operations are not shown or described in detail to avoid obfuscation. It will be readily understood that the methods, systems, computer program products, and apparatuses described in detail herein simply represent example implementations and use contexts, and that the embodiments are equally applicable to other implementations and use contexts.

The remainder of the disclosure begins with a general overview and proceeds to give a more detailed description of example embodiments with reference to the accompanying figures.

Figure 1:
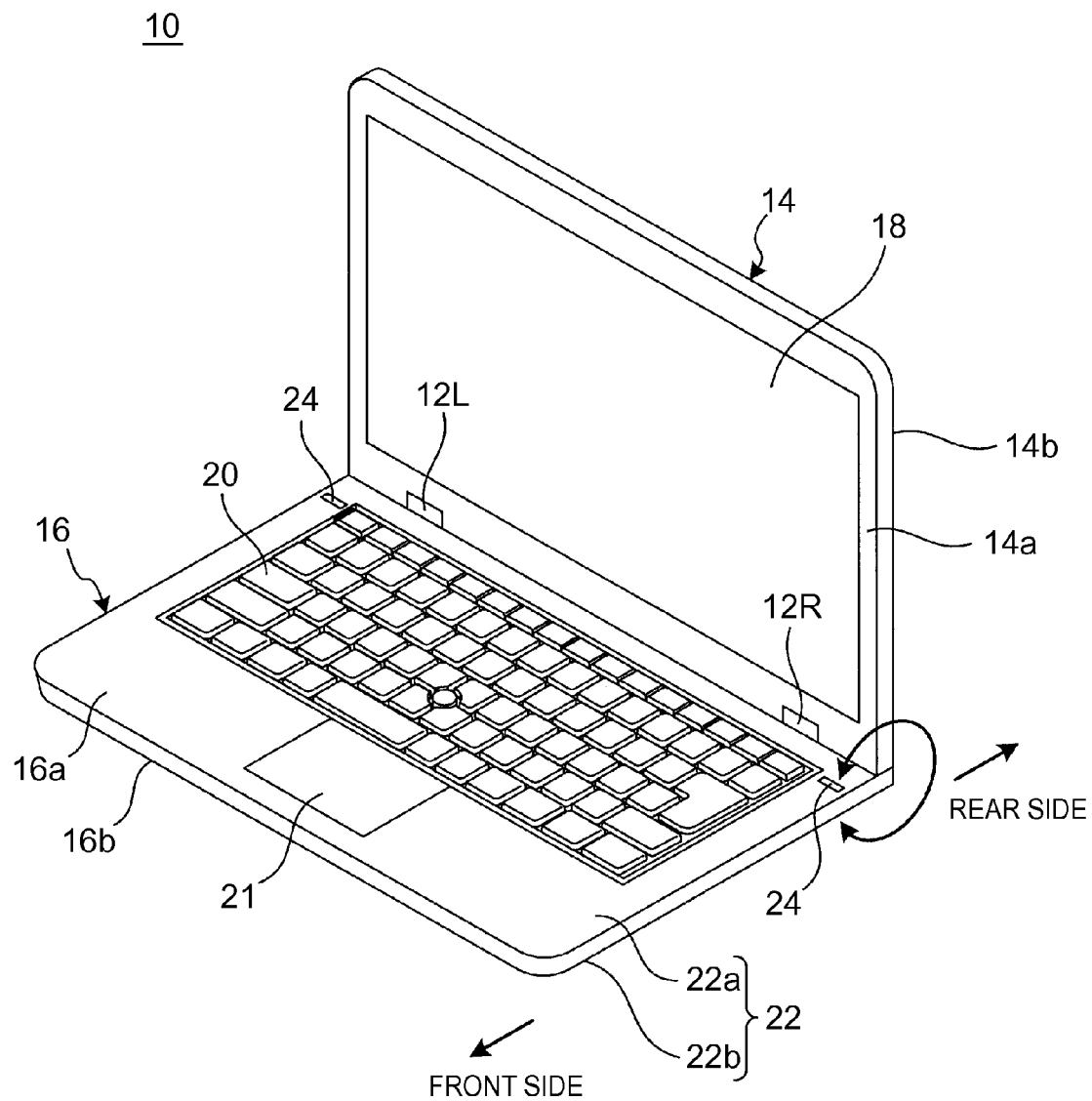
FIG. 1 illustrates a configuration of an electronic device in accordance with an embodiment.
Figure 2:
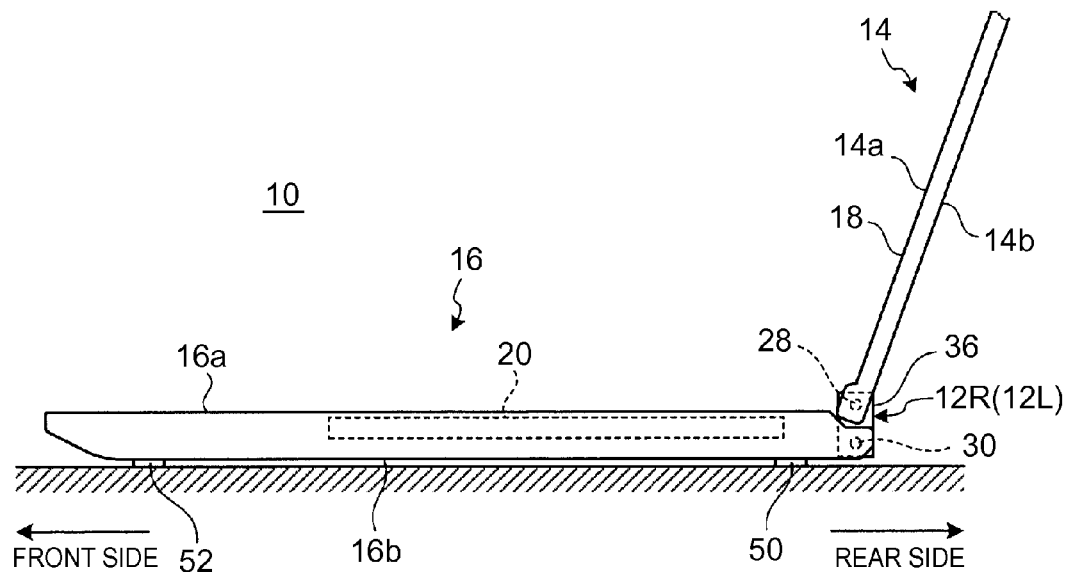
FIG. 2 illustrates a side view of an electronic device as a laptop PC.
Figure 3:
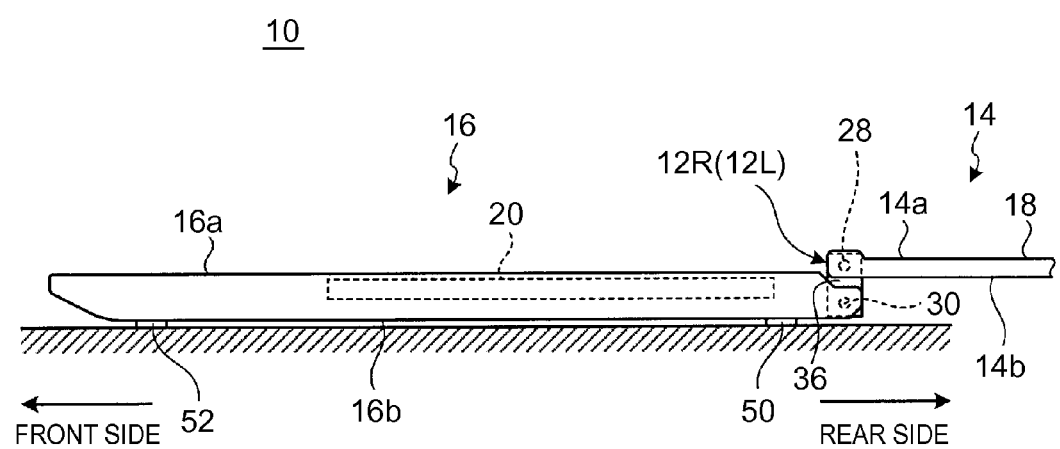
FIG. 3 illustrates a configuration where the display portion of an electronic device is rotationally moved in an opening direction to a 180-degree position.
Figure 4:
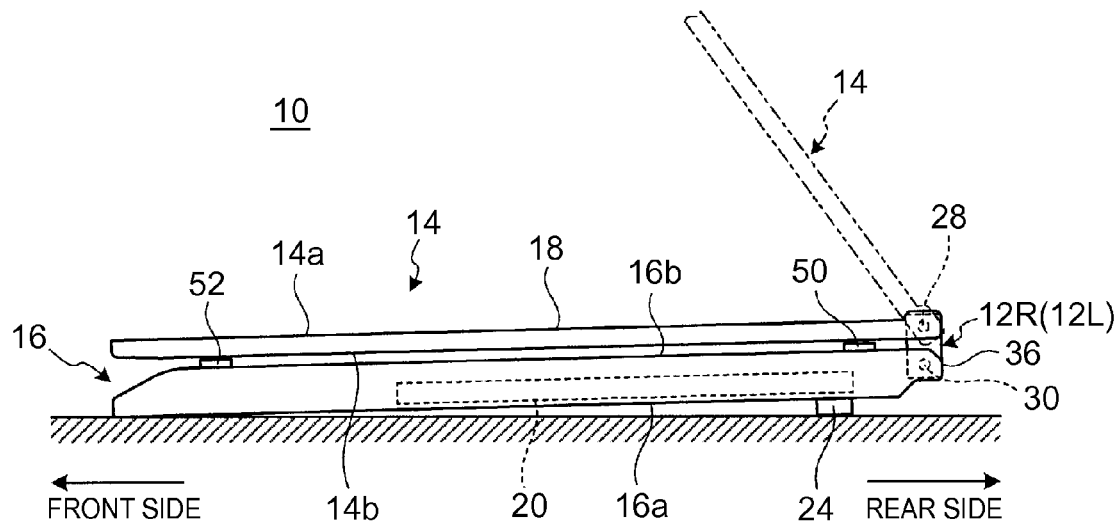
FIG. 4 illustrates a configuration of an electronic device as a tablet PC.

FIG. 1 is a perspective view of an electronic device 10 according to one embodiment of the present invention, showing a state where a display part 14 is opened from a main body part 16 by means of hinge mechanisms 12L and 12R so that both will be essentially perpendicular to each other. FIG. 2 is a side view showing a possible configuration of the electronic device 10 shown in FIG. 1 as a laptop PC. FIG. 3 is a side view in a state where the display part 14 is rotated 180-degrees from the state shown in FIG. 2 and laid flat in-line with the main body part 16. FIG. 4 is a side view showing a possible configuration of the electronic device as a tablet PC in which the display part 14 is moved 180 degrees from the state shown in FIG. 3 so that the front face of the display panel faces upward.

The electronic device 10 can be suitably used as a laptop PC when the display part 14 is angled at a position approximately 90 degrees relative to the main body part 16 (see FIG. 1 and FIG. 2). The electronic device 10 can also be suitably used as a tablet PC when the display part 14 is rotated 360 degrees and laid back on the main body part 16 (see FIG. 4). As a result of the dual configurations, the electronic device 10 is a so-called convertible tablet personal computer (convertible PC). As indicated by the two-dot chain line in FIG. 4, when used as tablet PC, if the display part 14 is slightly raised from the flat position, the electronic device 10 can be used as a stand type tablet PC with the main body part 16 as the base. Note that, in addition to such a convertible PC, the present invention can be suitably applied to electronic devices such as cellular phones, a smart phones, and various electronic organizers as long as the display part can be rotated 360 degrees relative to the main body part.

For descriptive convenience, it is assumed that the display part 14 is completely closed to the main body part 16 at an angle position between the main body part 16 and the display part 14 by means of hinge mechanisms 12L and 12R, and the position where the display 18 and the keyboard 20 face each other is called a 0-degree position (not shown). It is then assumed that the description is made by changing the angle in a direction to move the display part 14 rotationally in the opening direction using this 0-degree position as a reference. For example, it is assumed that a position where the display 18 and the keyboard 20 are in-line with each other while facing the same direction (upward in FIG. 3) is called a 180-degree position (see FIG. 3), and a position where the back faces of the display 18 and the keyboard 20, i.e., a back face 14b of the display part 14 and a lower face 16b of the main body part 16, face each other is called a 360-degree position (see FIG. 4).

The following description will be made based on the usage as the laptop PC shown in FIG. 1 and FIG. 2. In relation to a user who looks directly at the front face of the display part 14a, the side closest to the user is called the front side (forward) and side furthest away from the user is called the rear side (rearward). The thickness of the main body part 16 will be referred to as the vertical direction and the width will be referred to as the lateral direction.

As shown in FIG. 1, the electronic device 10 includes the display part 14 containing the display 18 and the main body part 16 containing the keyboard 20. The display part 14 and the main body part 16 are constantly connected, from the 0-degree position up to the 360-degree position, by a pair of right and left hinge mechanisms 12L and 12R (hereinafter also collectively called "hinge mechanism 12").

The display part 14 is electrically connected to the main body part 16 by a cable, not shown, through the hinge mechanism 12. The display 18 is a touch panel type liquid crystal display.

The main body part 16 is configured such that the hinge mechanism 12 is located at the rear edge portion of the main body housing 22. The main body housing 22 is formed into the shape of a flat box and contains various electronic components, not shown, such as a substrate, an arithmetic unit, and a memory that are housed within it. A pair of right and left upper leg portions (leg portions or cushion portions) 24, are provided at the rear side of the upper face 16a of the main body part 16. The upper leg portions 24 are extendable and retractable from openings provided in the upper face 16a of the main body part 16, specifically from openings 25 formed in an upper cover 22a of the main body housing 22 (see FIG. 4 and FIG. 8), and this extending/retracting movement (advance/retreat movement) is interlocked with the rotational movement of the display part 14 by means of the hinge mechanism 12.

Next, a specific example of the structure of the hinge mechanism 12 will be described, and an advance/retreat mechanism of the upper leg portions 24 interlocked with the rotational movement of the display part 14 by means of the hinge mechanism 12 will then be described.

Figure 5:
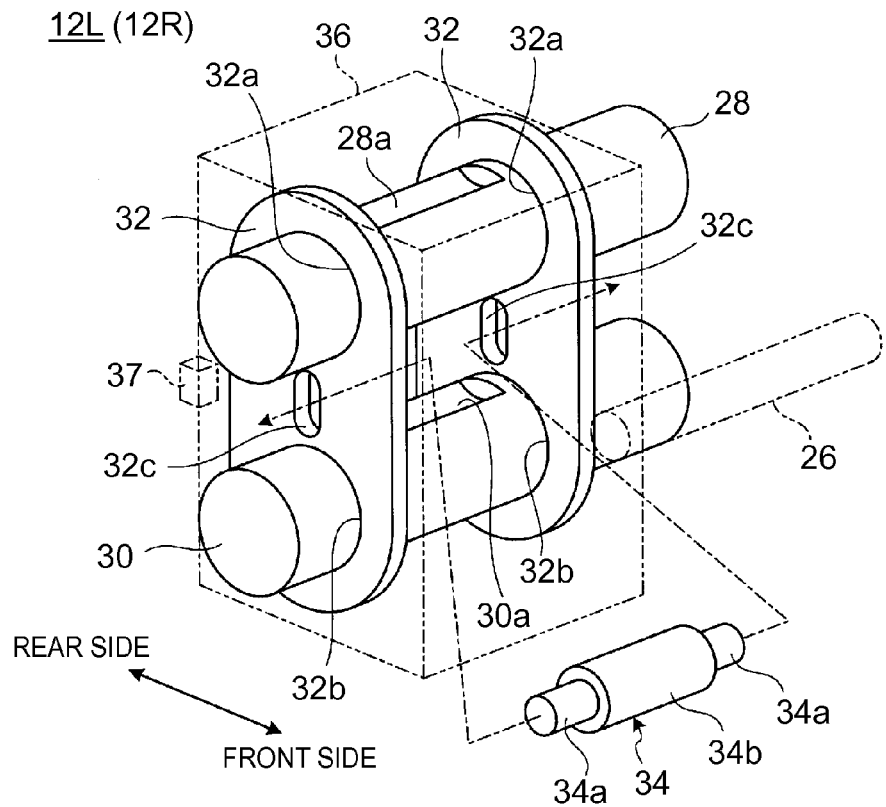
FIG. 5 illustrates the structure of a hinge mechanism provided in the electronic device.

FIG. 5 is a perspective view schematically showing the structure of the hinge mechanism 12 provided in the electronic device 10 according to the embodiment, showing a state of the left hinge mechanism 12L when the display part 14 is in a range from the 0-degree position to the 180-degree position relative to the main body part 16. The following description will be made by illustrating the left hinge mechanism 12L as the hinge mechanism 12 as shown in FIG. 5 (and FIG. 6). Since the right hinge mechanism 12R is bilaterally symmetrical to the left hinge mechanism 12L and basically of the same structure except that the mounting position of a link pin 26 indicated by the two-dot chain line in FIG. 5 is opposite in right and left, the detail description thereof will be omitted.

As shown in FIG. 5, the hinge mechanism 12L (12R) includes a first shaft (first axis) 28 extending in the lateral direction, a second shaft (second axis) 30 placed in parallel with the first shaft 28, and a pair of right and left guide plates 32, which provide rotatable support for the first shaft 28 and the second shaft 30, respectively. A float pin 34 capable of reciprocating between the first shaft 28 and the second shaft 30 is provided in a position between the pair of guide plates 32, 32 and sandwiched between the first shaft 28 and the second shaft 30.

The first shaft 28 is coupled to the display part 14, and is not rotatable, by inserting and fixing both ends of the first shaft 28 into fitting holes, not shown, provided in a housing of the display part 14. The second shaft 30 is coupled to the main body part 16, also not rotatable, by inserting and fixing both ends of the second shaft 30 into fitting holes, not shown, provided in the main body housing 22 of the main body part 16.

Each guide plate 32 is a belt-like plate member with both ends formed into the shape of a circular arc, and shaft holes 32a, 32b are formed to pass through the guide plates 32 in circular arc portions of the both ends, respectively. The first shaft 28 is rotated into the shaft hole 32a and the second shaft 30 is rotated into the shaft hole 32b. Thus, the display part 14 is able to rotate as a result of the combination of the guide plate 32 with the first shaft 28, and the main body part 16 is able to rotate as a result of the combination of the guide plate 32 with the second shaft 30.

An elongated hole 32c extends vertically in between the shaft holes 32a, 32b (FIG. 5) and is formed in a central portion between the shaft holes 32a, 32b of each guide plate 32. Small diameter portions 34a at both ends of the float pin 34 are inserted into the elongated holes 32c.

The small diameter portions 34a at both ends of the float pin 34 are inserted from the inner surface side into the elongated holes 32c of the right and left guide plates 32, respectively, and a central large diameter portion 34b prevents the float pin 34 from coming off the elongated holes 32c. Thus, the float pin 34 is supported between the right and left guide plates 32, 32 in a position between the first shaft 28 and the second shaft 30 and is movable along the longitudinal direction of the elongated holes 32c and rotatable with the elongated holes 32c as bearings.

A groove portion 28a and a groove portion 30a formed into the shape of a circular arc and capable of fitting a part of the large diameter portion 34b of the float pin 34 are formed in an outer peripheral surface of the central portions between the right and left guide plates 32, 32 of the first shaft 28 and the second shaft 30. As shown in FIG. 5, the groove portions 28a and 30a are formed in positions where the display part 14 faces upward in the range from the 0-degree position to the 180-degree position relative to the main body part 16. Therefore, in the state shown in FIG. 5, the large diameter portion 34b of the float pin 34 located in a lower position of the elongated hole 32c by gravity is fitted in the groove portion 30a of the second shaft 30 (see FIG. 6(A) to FIG. 6(D)).

As indicated by the two-dot chain line in FIG. 5, the hinge mechanism 12L (12R) has a box-shaped hinge case 36. The peripheral end faces of each guide plate 32 are fixed to the inner surface of the hinge case 36 so that the hinge case 36 will house all components of the hinge mechanism 12L (12R) including the guide plate 32, and only both ends of the first shaft 28 and both ends of the second shaft 30 protrude to the outside from both right and left sides of the hinge case 36, and are coupled to the display part 14 and the main body part 16, respectively.

The link pin 26 is provided in a protruding manner at a front side of the second shaft 30 as one side face of the hinge case 36 (see the link pin 26 indicated by the two-dot chain line in FIG. 5). The link pin 26 is a part for interlocking the hinge mechanism 12 and the upper leg portion 24 with each other, and is provided on an internal surface of each of the right and left hinge mechanisms 12L, 12R (also see FIG. 7).

A stopper piece 37 is provided in a protruding manner at a rear side of the elongated hole 32c as the other side face of the hinge case 36 (see the stopper piece 37 indicated by the two-dot chain line in FIG. 5). The stopper piece 37 is a member that comes into contact with the display part 14 in the 180-degree position to restrict further rotational movement beyond the angle position (also see FIG. 6(D)).

Next, the rotational movements of the display part 14 and the main body part 16 by means of the hinge mechanism 12 will be described.

Figure 6:
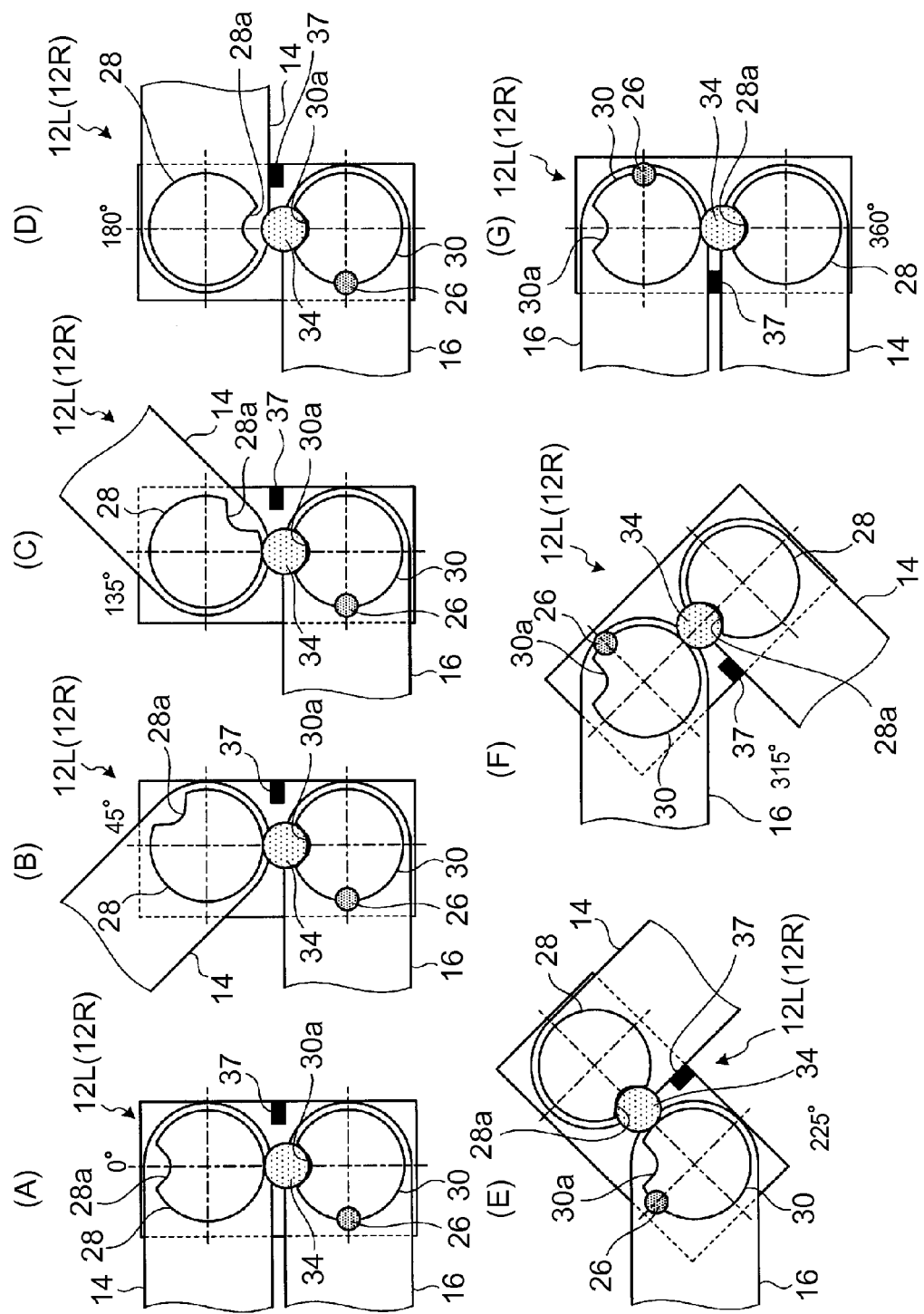
FIGS. 6A, 6B, 6C, 6D, 6E, 6F and 6G illustrate an explanatory diagram schematically showing the rotational movement of a display part relative to a main body part using the hinge mechanism.

FIG. 6 is an explanatory diagram schematically showing the rotational movement of the display part 14 relative to the main body part 16 using the hinge mechanism 12 shown in FIG. 5, where the movement of the left hinge mechanism 12L is representatively shown. In FIG. 6, FIG. 6(A) is a diagram showing the 0-degree position, FIG. 6(B) is a diagram showing a 45-degree position, FIG. 6(C) is a diagram showing a 135-degree position, FIG. 6(D) is a diagram showing the 180-degree position, FIG. 6(E) is a diagram showing a 225-degree position, FIG. 6(F) is a diagram showing a 315-degree position, and FIG. 6(G) is a diagram showing the 360-degree position.

When the display part 14 is rotationally moved in a direction to open the display part 14 from the main body part 16, the rotation of the second shaft 30 is restricted in the range from the 0-degree position to the 180-degree position shown in FIG. 6(A) to FIG. 6(D) because the float pin 34 is fitted in the groove portion 30a, where the main body part 16 and the second shaft 30 are integrated with the hinge case 36. Therefore, the display part 14 rotationally moves together with the first shaft 28 by using the first shaft 28 as the rotating axis with respect to the main body part 16, the second shaft 30, and the hinge case 36 to enable use of the electronic device 10 as the laptop PC as shown in FIG. 2.

In the 180-degree position shown in FIG. 6(D) (also see FIG. 3), the back face 14b of the display part 14 comes into contact with the stopper piece 37 provided in the hinge case 36 to restrict the rotational movement using the first shaft 28 as the rotating axis. In this state, the groove portion 28a of the first shaft 28 faces downward and comes to a position capable of receiving the float pin 34.

Subsequently, when the display part 14 is further moved rotationally in the opening direction beyond the 180-degree position, the display part 14 and the first shaft 28 are integrated with the hinge case 36 through the stopper piece 37 in turn as shown in FIG. 6(E), starting rotational movement using the second shaft 30 as the rotating axis. Along with this rotational movement, the float pin 34 is separated from the groove portion 30a of the second shaft 30 and inserted into the groove portion 28a of the first shaft 28, canceling the integration of the main body part 16 and the second shaft 30 with the hinge case 36. Thus, as shown in FIG. 6(E) to FIG. 6(G), the display part 14, the first shaft 28, and the hinge case 36 are integrated in the opening direction beyond the 180-degree position, and the display part 14 rotationally moves relative to the main body part 16 using the second shaft 30 as the rotating axis.

Ultimately, as shown in FIG. 6(G), when the display part 14 goes around to the back face of the main body part 16 and the stopper piece 37 comes into contact with the back face of the main body part 16, the rotational movement is restricted to the 360-degree position to enable the use of the electronic device 10 as the tablet PC shown in FIG. 4.

Next, an advance/retreat structure of the upper leg portion 24 interlocked with the rotational movement of the display part 14 by means of the hinge mechanism 12 will be described.

Figure 7:
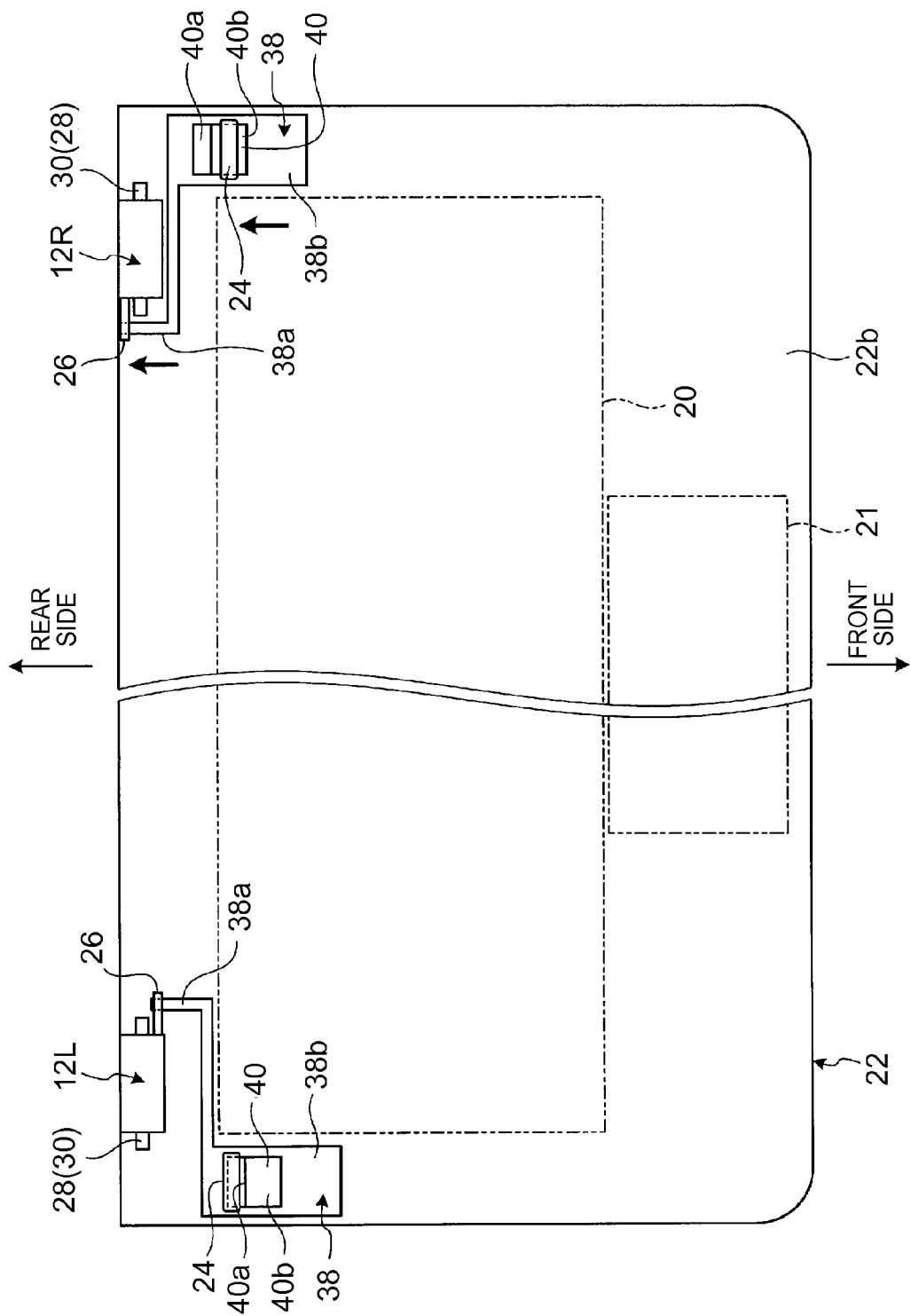
FIG. 7 illustrates the internal structure of a main body part.
Figure 8:
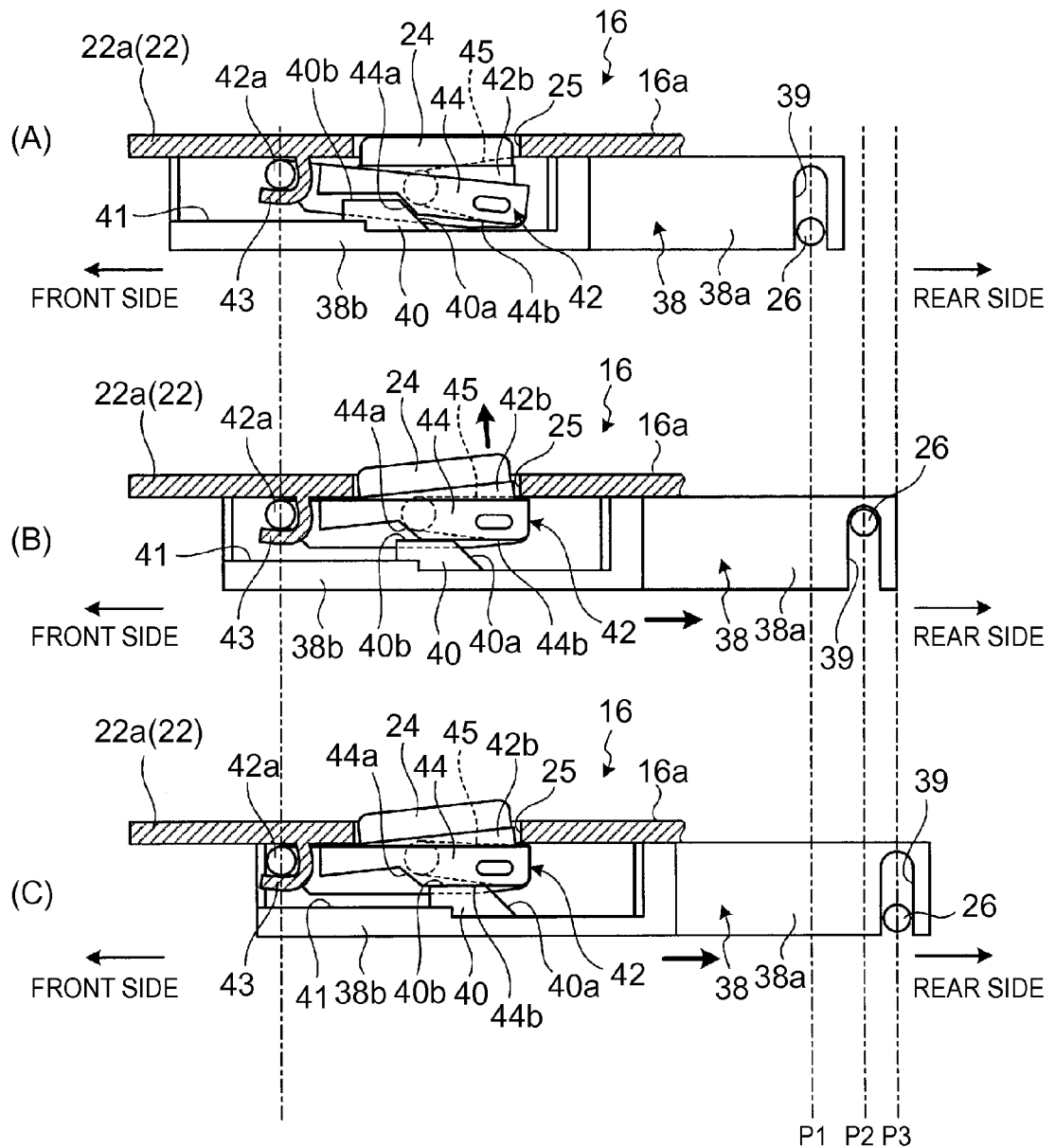
FIGS. 8A, 8B and 8C illustrate the advance/retreat movement of an upper leg portion.

FIG. 7 is a plan view schematically showing the internal structure of the main body part 16. FIG. 7 is a plan view schematically showing the upper leg portions 24 and slide members 38 for advancing and retreating the upper leg portions 24, where the upper cover 22a of the main body housing 22 is removed. FIG. 7 shows that the left hinge mechanism 12L and one slide member 38 interlocked with the left hinge mechanism 12L are in the state of the 0-degree position, and the right hinge mechanism 12R and the other slide member 38 interlocked with the right hinge mechanism 12R are in the state of the 360-degree position. FIG. 8 is a side view for describing the advance/retreat movement of the upper leg portion 24, where FIG. 8(A) is a view showing a state of the upper leg portion 24 and the slide member 38 in a range from the 0-degree position to the 180-degree position, FIG. 8(B) is a view showing a state of the upper leg portion 24 and the slide member 38 in a 270-degree position, and FIG. 8(C) is a view showing a state of the upper leg portion 24 and the slide member 38 in the 360-degree position.

As shown in FIG. 7 and FIG. 8, the slide member 38 formed into an L shape in a plan view is provided inside the main body housing 22 of the main body part 16 to be movable in a front-rear direction on the upper face (inner face) of the lower cover 22b. The slide member 38 includes an engaging arm 38a extending from one end of the L shape to the rear side, and a pressing plate 38b arranged at the other end of the L shape below the upper leg portion 24.

An engaging recessed portion 39 extending in the vertical direction and being open downward is provided at the tip of the engaging arm 38a. The link pin 26 of the hinge mechanism 12 is engaged in the engaging recessed portion 39 from above to engage the link pin 26 with the engaging arm 38a (slide member 38) so that the link pin 26 will be kept movable and rotatable in the vertical direction within the engaging recessed portion 39. The pressing plate 38b includes a pressing base 40 having a pressing side inclined face 40a gradually inclined downward toward the rear side as an advancingly moving direction of the slide member 38, and a base seat 40b extending forward from the top of the pressing side inclined face 40a. The pressing base 40 is formed on the pressing plate 38b to extend in the front-rear direction, and provided on the upper face of a plate 41 with a step or a difference in level provided in a part thereof.

As shown in FIG. 8, the upper leg portion 24 is a leg member formed of a rubber material or a resin material placed in an opening 25 of the upper cover 22a of the main body housing 22. The lower end (proximal end) of the upper leg portion 24 is supported by an upper base member 42 provided within the main body part 16 to be movable up and down so as to advance and retreat the upper leg portion 24 in the vertical direction so that the upper leg portion 24 can be extended from and retracted into the opening 25.

As shown in FIG. 8, the upper base member 42 is a plate-like member with the upper leg portion 24 fixed on the upper end face thereof. A shaft pin 42a is provided at the front end of the upper base member 42 along the lateral direction, and pivotally supported by a bearing portion 43 formed into a curved shape on the lower face of the upper cover 22a. The upper base member 42 includes a cradle 44 having a receiving side inclined face 44a gradually inclined downward toward the rear side, and a base seat 44b extending rearward from the lower end of the receiving side inclined face 44a. The receiving side inclined face 44a faces the pressing side inclined face 40a of the slide member 38 to be able to contact slidingly. A support base 42b for supporting the upper leg portion 24 is provided in an upper part of the cradle 44. Note that the upper base member 42 is omitted in FIG. 7 to ensure better viewing clarity.

As shown in FIG. 8(A) to FIG. 8(C), the upper base member 42 can rotate around the shaft pin 42a as a rotating axis in the vertical direction with respect to the main body housing 22, and the up and down movement of the upper base member 42 causes the upper leg portion 24 to extend from and retract into the opening 25. A torsion coil spring (elastic member) 45 is arranged in the upper base member 42 in such a manner that one end presses the upper base member 42 downward and the other end presses the lower face of the upper cover 22a upward. The upper base member 42 is always influenced downward by an influencing force of the torsion coil spring 45, and this also causes the upper leg portion 24 to be influenced in a retracting direction where the upper leg portion 24 always sinks in the opening 25.

Next, the advance/retreat movement of the upper leg portion 24 will be described.

During the rotational movement of the display part 14 by means of the hinge mechanism 12, the link pin 26 protruding from the side face of the hinge case 36 is held in the same position together with the hinge case 36, the position of which remains unchanged in the range from the 0-degree position to the 180-degree position shown in FIG. 6(A) to FIG. 6(D), staying in a position as the forward side of the second shaft 30. Then, when the display part 14 is rotationally moved in the opening direction beyond the 180-degree position, the link pin 26 is also moved gradually rearward in turn along with the hinge case 36 rotationally moving around the second shaft 30 as the center of axle (see FIG. 6(E) and FIG. 6(F)), and in the 360-degree position, the link pin 26 is moved to a position as the rear side of the second shaft 30 (see FIG. 6(G)).

Thus, the position of the link pin 26 does not change in the front-rear direction in the hinge mechanism 12 while the angle of rotational movement of the display part 14 is smaller than or equal to the 180-degree position. Only after exceeding the 180-degree position does the link pin 26 gradually move to the rear side as the angle of rotational movement increases.

Thus, as shown in FIG. 8(A), the link pin 26 stays in position P1 without changing its position thereof in the front-rear direction in the range from the 0-degree position to the 180-degree position as mentioned above, and the slide member 38 also stays in the initial position. At this time, the pressing side inclined face 40a of the pressing base 40 and the receiving side inclined face 44a of the cradle 44 are in such a positional relationship that both face each other in proximity to or in slight contact with each other. Therefore, the upper base member 42 is in a retreating moving position where upper base member 42 rotationally moves downward by the biasing force of the torsion coil spring 45, and the upper leg portion 24 sinks into the opening 25 with the upper face made flush with or substantially flush with the upper face 16a of the main body part 16. In other words, during use as the laptop PC as shown in FIG. 2 (from the 0-degree position to the 180-degree position), the upper leg portion 24 forms part of the upper face 16a of the main body part 16 without becoming obstructive during use of the electronic device 10 and deteriorating the appearance of the electronic device 10.

Subsequently, when the display part 14 is rotationally moved beyond the 180-degree position, the link pin 26 pivotally moves upward around the second shaft 30 as the rotating axis by means of the hinge case 36 rotationally moving in the opening direction around the second shaft 30 as the center of axle to move the position thereof in the front-rear direction rearward. Then, for example, the link pin 26 in the 270-degree position comes to position P2 shown in FIG. 8(B) (also see FIG. 6(E) and FIG. 6(F)). Thus, as shown in FIG. 8(B), the link pin 26 draws the slide member 38 near to move the slide member 38 rearward while moving upward within the engaging recessed portion 39 of the engaging arm 38a of the slide member 38.

As shown in FIG. 8(B), when the slide member 38 moves rearward, the pressing side inclined face 40a of the pressing base 40 and the receiving side inclined face 44a of the cradle 44 slidingly contact with each other so that the receiving side inclined face 44a the position of which in the front-rear direction is restricted by the shaft pin 42a will receive a push-up force from the pressing side inclined face 40a moving rearward. Therefore, the upper base member 42 rotationally moves upward around the shaft pin 42a as the center of axle against the biasing force of the torsion coil spring 45 to make the upper leg portion 24 advancingly move upward and protrude from the opening 25. At this time, for example, in the 270-degree position shown in FIG. 8(B), since the pressing side inclined face 40a completely climbs over the receiving side inclined face 44a, the base seat 40b of the pressing base 40 and the base seat 44b of the cradle 44 are in contact with each other.

When the display part 14 is further moved rotationally, the link pin 26 pivotally moves around the second shaft 30 as the center of axle to gradually move downward, and the position thereof in the front-rear direction further moves rearward. Then, for example, the link pin 26 in the 360-degree position comes to position P3 shown in FIG. 8(C) (also see FIG. 6(G)). Thus, as shown in FIG. 8(C), the link pin 26 draws the slide member 38 near to further move the slide member 38 rearward while moving downward in turn within the engaging recessed portion 39 of the engaging arm 38*a* of the slide member 38.

As shown in FIG. 8(C), when the slide member 38 further moves rearward, since the base seat 40*b* of the pressing base 40 and the base seat 44*b* of the cradle 44 slidingly contact with each other in the horizontal direction, the upper leg portion 24 is kept protruding from the opening 25. In other words, during use as the tablet PC as shown in FIG. 4 (e.g., 360-degree position) or during use as a stand type tablet PC (e.g., 270-degree position), the upper leg portion 24 is protruding from the upper face 16*a* (the lower face in FIG. 4) of the main body part 16, functioning as a leg portion when the electronic device 10 is placed on a desk or the like. At this time, since the base seat 44*b* of the cradle 44 is stably in surface contact with the base seat 40*b* of the pressing base 40, the upper base member 42 prevents backlash of the upper leg portion 24.

On the other hand, when the display part 14 in the 360-degree position is rotationally moved in a closing direction, since movement in a direction opposite to the rotational movement in the opening direction mentioned above occurs, the link pin 26 moves forward along with the rotational movement of the display part 14 from the 360-degree position to the 180-degree position. Therefore, the upper base member 42 also moves downward retreatally by the biasing force of the torsion coil spring 45 along with the transition of the pressing base 40 and the cradle 44 from the state of sliding contact between the base seat 40*b* and the base seat 44*b* to the state of sliding contact between the pressing side inclined face 40*a* and the receiving side inclined face 44*a* again. Then, the upper leg portion 24 sinks into the opening 25 again as shown in FIG. 8(A) after the position of the display part 14 falls below the 180-degree position.

Such an advance/retreat structure may also be applied to a lower leg portion 50 provided in the lower face 16*b* of the main body part 16 as well as the upper leg portion 24 provided in the upper face 16*a* of the main body part 16.

In other words, as shown in FIG. 2 and FIG. 3, lower leg portions 50 as leg members used when the electronic device 10 is used as the laptop PC are provided on both rear sides of the lower face 16*b* of the main body part 16. Therefore, as shown in FIG. 4, when the display part 14 is set in the 360-degree position, the lower face 16*b* of the main body part 16 and the back face 14*b* of the display part 14 are placed face to face. In this case, however, the lower leg portions 50 may become obstructive depending on the structure and shape of the hinge mechanism 12, making the entire electronic device 10 thick during use as the tablet PC in the 360-degree position. Accordingly, there are concerns that the ease of handling and the operability may be lowered.

As shown in FIG. 2 and FIG. 3, legs 52 are also provided on both front sides of the lower face 16*b* of the main body part 16. Note that the height of the lower leg portions 50 on the rear side are set higher than the legs 52 on the front side so that the electronic device 10 can be placed on a desk or the like to make the electronic device 10 high toward the rear end in consideration of operability during use as the laptop PC. Therefore, in the 360-degree position, the height of the lower leg portions 50 affects the thickness of the electronic device 10 more largely than that of the legs 52. In regard to this point, although the advance/retreat structure is provided in the lower leg portions 50 on the rear side in the embodiment, a similar advance/retreat structure can be of course provided in the legs 52 on the front side.

Figure 9:
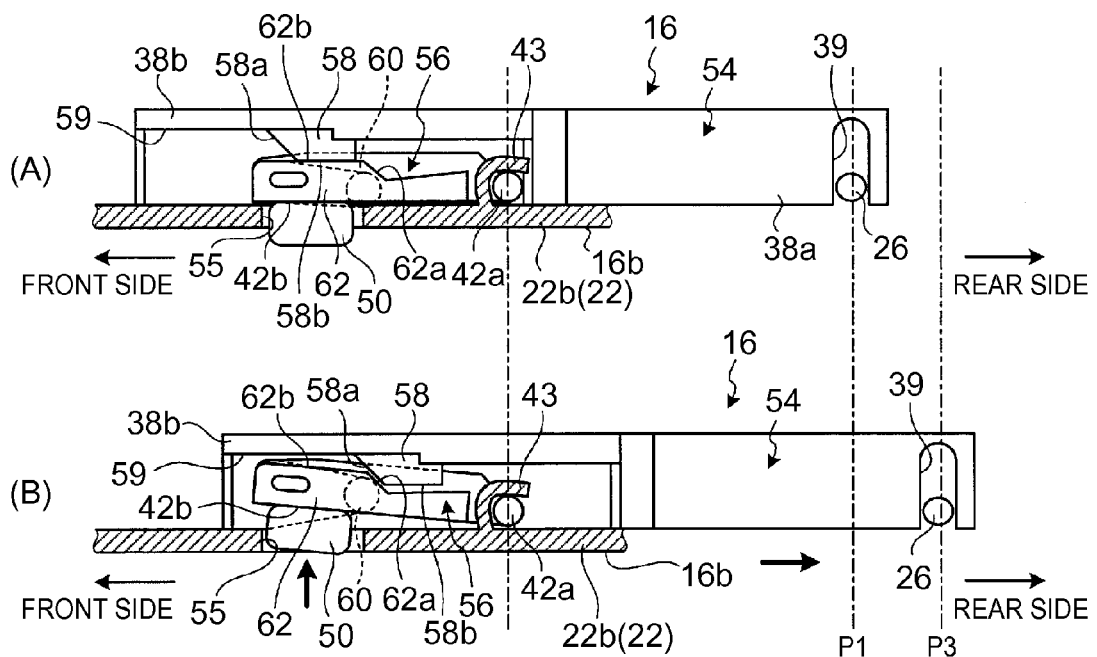
FIGS. 9A and 9B illustrate the advance/retreat movement of a lower leg portion.

FIG. 9 is a side view for describing the advance/retreat movement of a lower leg portion 50, where FIG. 9(A) is a view showing a state of the lower leg portion 50 and a slide member 54 in a range from the 0-degree position to the 180-degree position, and FIG. 9(B) is a view showing a state of the lower leg portion 50 and the slide member 54 in the 360-degree position. Reference numeral 55 in FIG. 9 denotes an opening formed in the lower cover 22*b* of the main body housing 22 so that the lower leg portion 50 will extend from and retract into the opening.

As shown in FIG. 9, the advance/retreat structure of the lower leg portion 50 uses a slide member 54 and a lower base member 56 similar to the slide member 38 and the upper base member 42 mentioned above. As shown in FIG. 9, the slide member 54 and the lower base member 56 have such a structure that the slide member 38 and the upper base member 42 shown in FIG. 8 are rotated 180 degrees and turned upside down. Therefore, elements of the slide member 54 and the lower base member 56 shown in FIG. 9 identical or similar in function and effect to those of the slide member 38 and the upper base member 42 shown in FIG. 8 are given the same reference numerals to omit the detailed description thereof.

The slide member 54 is formed into an L shape in a plan view, and provided to be movable in the front-rear direction on the upper face (inner face) of the lower cover 22*b*, including the engaging arm 38*a* and the pressing plate 38*b*. The slide member 54 basically has the same structure as the slide member 38 except that a pressing base 58 the vertical direction of which is opposite to that of the pressing base 40 is included. The pressing base 58 of the slide member 54 has a pressing side inclined face 58*a* gradually inclined downward toward the rear side as an advancingly moving direction of the slide member 54, and a base seat 58*b* extending forward from the lower end of the pressing side inclined face 58. The pressing base 58 is formed on the pressing plate 38*b* to extend in the front-rear direction, and provided on the lower face of a plate 59 with a step or a difference in level provided in a part thereof.

As shown in FIG. 9, a lower leg portion (a leg portion or a cushion) 50 is a leg member formed of a rubber material or a resin material placed in an opening 55 of the lower cover 22*b* of the main body housing 22. The lower leg portion 50 is supported by the lower base member 56 the upper end (proximal end) of which is movable up and down to advance and retreat the lower leg portion 50 in the vertical direction so that the lower leg portion 50 can be extended from and retracted into the opening 55.

The lower base member 56 is a plate-like member with the lower leg portion 50 fixed on the lower end face thereof. The lower base member 56 is rotational movable in the vertical direction relative to the main body housing 22 by means of a shaft pin 42*a* provided at the rear end. The up-and-down movement of this lower base member 56 causes the lower leg portion 50 to extend from and retract into the opening 55. A torsion coil spring (elastic member) 60 is arranged in the lower base member 56 in such a manner that one end presses the lower base member 56 upward and the other end presses the upper face of the lower cover 22*b* downward. The lower base member 56 is always influenced upward by an influencing force of the torsion coil spring 60, and this also causes the lower leg portion 50 to be influenced in the advancingly moving direction where the lower leg portion 50 always protrudes from the opening 55.

The lower base member 56 basically has the same structure as the upper base member 42 except that a cradle 62 the vertical direction of which is opposite to that of the cradle 44 is included. The cradle 62 of the lower base member 56 has a receiving side inclined face 62a gradually inclined downward toward the rear side, and a base seat 62b extending forward from the top of the receiving side inclined face 62a. The receiving side inclined face 62a faces the pressing side inclined face 58a of the slide member 54 to be able to contact slidingly therewith.

Next, the advance/retreat movement of the lower leg portion 50 will be described.

As shown in FIG. 9(A), since the link pin 26 stays in position P1 without changing the position thereof in the front-rear direction in the range from the 0-degree position to the 180-degree position, the slide member 54 also stays in the initial position, where the base seat 58b of the pressing base 58 and the base seat 62b of the cradle 62 are in contact with each other. Therefore, the lower base member 56 rotationally moves downward around the shaft pin 42a as the center of axle against the biasing force of the torsion coil spring 60 to make the lower leg portion 50 advancingly move downward and protrude from the opening 55. In other words, during use as the laptop PC as shown in FIG. 2 (from the 0-degree position to the 180-degree position), the lower leg portion 50 protrudes from the lower face 16b of the main body part 16, functioning as a leg portion when the electronic device 10 is placed on a desk or the like. At this time, since the base seat 62b of the cradle 62 is stably in surface contact with the base seat 58b of the pressing base 58, the lower base member 56 prevents backlash of the lower leg portion 50.

Subsequently, when the display part 14 is rotationally moved beyond the 180-degree position, the link pin 26 pivotally moves upward around the second shaft 30 as the center of axle by means of the hinge case 36 rotationally moving in the opening direction around the second shaft 30 as the center of axle to move the position thereof in the front-rear direction rearward. The link pin 26 then moves downward to move the position thereof in the front-rear direction further rearward. Then, in the 360-degree position, the link pin 26 comes to position P3 shown in FIG. 9(B) (also see FIG. 6(E) to FIG. 6(G)). Thus, the link pin 26 draws the slide member 54 near to move the slide member 54 rearward while moving from above to below within the engaging recessed portion 39 of the engaging arm 38a of the slide member 54.

As shown in FIG. 9(B), when the slide member 54 moves rearward, the lower base member 56 retreatally moves upward by the biasing force of the torsion coil spring 60 along with the transition of the pressing base 58 and the cradle 62 from the state of sliding contact between the base seat 58b and the base seat 62b to the state of sliding contact between the pressing side inclined face 58a and the receiving side inclined face 62a. Therefore, in the 360-degree position shown in FIG. 9(B), the lower base member 56 is in a retreatally moving position where the lower base member 56 is rotationally moved upward by the biasing force of the torsion coil spring 60, the lower leg portion 50 sinks into the opening 55, and the lower face thereof is made flush with or substantially flush with the lower face 16b of the main body part 16. In other words, during use as the tablet PC as shown in FIG. 4 (e.g., 360-degree position) or during use as the stand type tablet PC (e.g., 270-degree position), the lower leg portion 50 sinks into the lower face 16b (the upper face in FIG. 4) of the main body part 16. In this case, the lower leg portion 50 does not become obstructive between the lower face 16b of the main body part 16 and the back face 14b of the display part 14 where both are placed face to face, and this avoids making the entire electronic device 10 thick.

On the other hand, when the display part 14 in the 360-degree position is rotationally moved in the closing direction, since movement opposite to the rotational movement in the opening direction mentioned above occurs, the link pin 26 moves forward along with the rotational movement of the display part 14 from the 360-degree position to the 180-degree position. Therefore, the lower base member 56 retreatally moves downward against the biasing force of the torsion coil spring 60 in turn by the sliding contact action between the pressing side inclined face 58a of the pressing base 58 and the receiving side inclined face 62a of the cradle 62. Then, the lower leg portion 50 protrudes from the opening 55 again as shown in FIG. 9(A) after the position of the display part 14 falls below the 180-degree position.

The upper leg portions 24 and the lower leg portions 50 having the advance/retreat structure mentioned above may be installed side by side, or either of them may of course provided. When the upper leg portions 24 and the lower leg portions 50 are provided concurrently, the slide members 38 and 54 for advancingly/retreatally moving the upper base members 42 supporting the upper leg portions 24 and the lower base members 56 supporting the lower leg portions 50 just have to be provided within the main body part 16, respectively. Further, as shown in FIG. 10, these slide members 38 and 54 may be configured as one slide member 70 capable of driving each of the upper base members 42 and each of the lower base members 56 at the same time.

Figure 10:
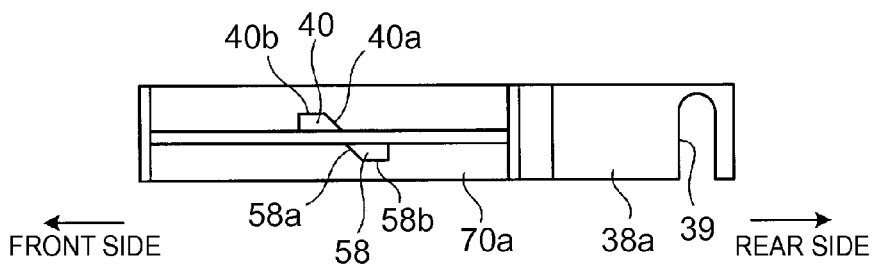
FIG. 10 illustrates a slide member according to an embodiment.

As shown in FIG. 10, the slide member 70 includes an engaging arm 38a to be engaged with the link pin 26 and a pressing plate 70a for advancing and retreating the upper base member 42 and the lower base member 56, where a pair of up and down pressing bases 40 and 58 are provided in this pressing plate 70a. Therefore, according to the slide member 70, the upper base member 42 can be moved advanced and retreated by the upper pressing base 40, and at the same time, the lower base member 56 can be advanced and retreated by the lower pressing base 58.

Figure 11:
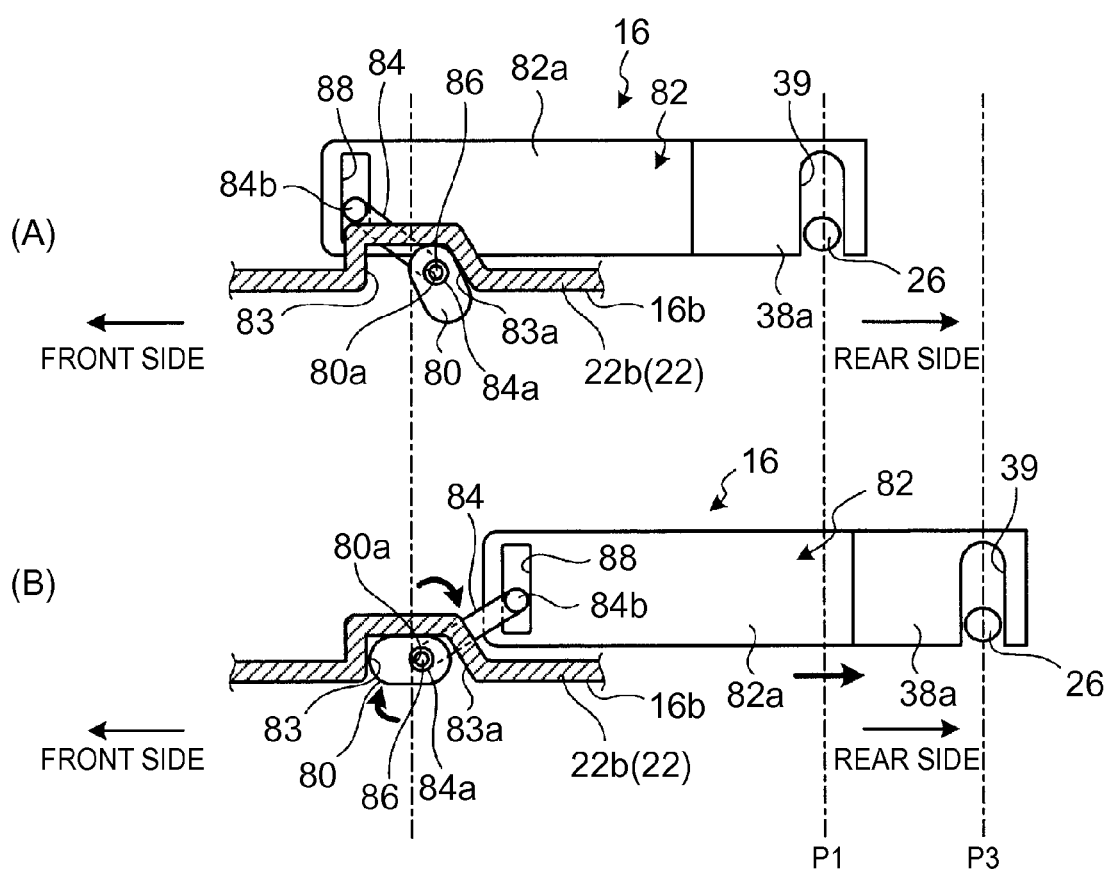
FIGS. 11A and 11B illustrate a side view for describing the advance/retreat movement of a lower leg portion according to an embodiment.

As the lower leg portions advanced to and retreated from the lower face 16b of the main body part 16, a lower leg portion 80 shown in FIG. 11 may be used instead of the lower leg portion 50 shown in FIG. 9.

FIG. 11 is a side view for describing the advance/retreat movement of the lower leg portion 80 according to a variation, where FIG. 11(A) is a view showing a state of the lower leg portion 80 and a slide member 82 in the range from the 0-degree position to the 180-degree position, and FIG. 11(B) is a view showing a state of the lower leg portion 80 and the slide member 82 in the 360-degree position.

As shown in FIG. 11, the lower leg portion (a leg portion or a cushion) 80 is a leg member formed of a rubber material or a resin material placed in a recessed portion 83 formed on the lower cover 22b of the main body housing 22. A shaft hole 80a passing through in the lateral direction is formed on one end side of the lower leg portion 80. A cylindrical portion 84a provided at one end of a link arm 84 is fitted and fixed into the shaft hole 80a in an unrotatable state, and a shaft pin 86 supported by the lower cover 22b is inserted into the inner hole of the cylindrical portion 84a in a rotatable state. The cylindrical portion 84a is fixed to the shaft hole 80a in a predetermined angle position so that the link arm 84 will extend in a direction slightly bent from the longitudinal direction (substantially the vertical direction in FIG. 11(A)) of the lower leg portion 80.

Like the slide member 54 mentioned above, the slide member 82 is formed into an L shape in a plan view, and provided to be movable in the front-rear direction on the upper face (inner face) of the lower cover 22b, including the engaging arm 38a and an engaging plate 82a. An elongated hole 88 elongated in the vertical direction is formed in a front end portion of the engaging plate 82a to pass through in the lateral direction, and a cylindrical portion 84b formed at the other end of the link arm 84 is inserted into the elongated hole 88 rotatably and movably in the vertical direction.

As shown in FIG. 11(A), since the link pin 26 stays in position P1 without changing the position thereof in the front-rear direction in the range from the 0-degree position to the 180-degree position, the slide member 82 also stays in the initial position, where the cylindrical portion 84b of the link arm 84 is situated on the lower end side of the elongated hole 88 of the slide member 82. Therefore, the lower leg portion 80 comes into contact with an inclined wall 83a on the rear end side of the recessed portion 83 of the lower cover 22b, and the tip (lower end) thereof protrudes from the recessed portion 83. In other words, during use as the laptop PC as shown in FIG. 2 (from the 0-degree position to the 180-degree position), the lower leg portion 80 protrudes from the lower face 16b of the main body part 16, functioning as a leg portion when the electronic device 10 is placed on a desk or the like. At this time, since the lower leg portion 80 is stably in contact with the inclined wall 83a inclined downward to the rear within the recessed portion 83, the backlash thereof is prevented.

Subsequently, when the display part 14 is rotationally moved beyond the 180-degree position, the link pin 26 gradually moves rearward, and comes to position P3 shown in FIG. 11(B) (also see FIG. 6(E) to FIG. 6(G)) in the 360-degree position to draw the slide member 82 near and move the slide member 82 rearward.

As apparent from FIG. 11(A) and FIG. 11(B), since one end of the cylindrical portion 84a of the link arm 84 pivotally supported by the shaft pin 86 on the lower cover 22b side, the other end of the cylindrical portion 84b inserted in the elongated hole 88 goes up and then down while rotating within the elongated hole 88 along with the movement of the slide member 82 to the rear side. Then, the link arm 84 rotationally moves clockwise around the shaft pin 86 as the rotating axis in FIG. 11 along with the movement of this cylindrical portion 84b, and the link arm 84 is ultimately set to an angle of rotational movement in the 360-degree position shown in FIG. 11(B). Therefore, the lower leg portion 80 fixed to the cylindrical portion 84a also rotationally moves clockwise around the shaft pin 86 as the rotating axis in FIG. 11 along with the rotational movement of the link arm 84, the entire lower leg portion 80 is housed within the recessed portion 83, and the lower face thereof is made flush with or substantially flush with the lower face 16b of the main body part 16. In other words, during use as the tablet PC as shown in FIG. 4 (e.g., 360-degree position) or during use as the stand type tablet PC (e.g., 270-degree position), the lower leg portion 80 sinks into the lower face 16b (the upper face in FIG. 4) of the main body part 16. In this case, the lower leg portion 80 does not become obstructive between the lower face 16b of the main body part 16 and the back face 14b of the display part 14 where both are placed face to face, and this avoids making the entire electronic device 10 too bulky.

As described above, the electronic device 10 according to the embodiment includes the upper leg portions 24 or (and) the lower leg portions 50 (80) that are advanced and retreated from the upper face 16a or (and) the lower face 16b of the main body part 16 in response to the rotational movement of the display part 14 from the 180-degree position to the 360-degree position relative to the main body part 16. Therefore, even when the display part 14 is rotationally moved relative to the main body part 16, since the upper leg portions 24 or (and) the lower leg portions 50 (80) can be automatically advanced and retreated to an appropriate extending/retracting position according to the usage of the electronic device 10, high operability and ease of handling can be obtained, and the keyboard 20 and the like can be prevented from being scratched or damaged from accidentally touching the desk or other hard surface.

In other words, the upper leg portions 24 to be advanced and retreated from the upper face 16a of the main body part 16 are so provided that the upper leg portions 24 can be advanced and retreated in response to the rotational movement of the display part 14 from the 180-degree position to the 360-degree position. Therefore, for example, when the electronic device 10 as a convertible PC is used as the tablet PC by changing the shape thereof, for example, to the 360-degree position, the upper leg portions 24 are automatically protruded from the upper face 16a of the main body part 16 to function as leg portions. This enables stable operation of the electronic device 10. Further, the keyboard 20 and the like that come to the lower face side during use can be prevented from being scratched or damaged. In addition, when the electronic device 10 is used as the laptop PC, since the upper leg portions 24 can be made to sink into the upper face 16a of the main body part 16, the upper leg portions 24 can be prevented from becoming obstructive during use, and the deterioration of the appearance can also be avoided.

On the other hand, the lower leg portions 50 (80) to be advanced and retreated from the lower face 16b of the main body part 16 is so provided that the lower leg portions 50 can be advanced and retreated in response to the rotational movement of the display part 14 from the 180-degree position to the 360-degree position. Therefore, for example, when the electronic device 10 as a convertible PC is used as the tablet PC by changing the shape thereof, for example, to the 360-degree position, the lower leg portions 50 can be automatically made to sink into the lower face 16b of the main body part 16. This can prevent the entire device from being too bulky making it easier to handle while simultaneously increasing operability. Further, when the electronic device 10 is used as the laptop PC, the lower leg portions 50 can be protruded from the lower face 16b of the main body part 16. In this case, the lower leg portions 50 are protruded from the lower face 16b of the main body part 16 to function as leg portions, and this enables stable operation of the electronic device 10.

The electronic device 10 employs a biaxial structure as the hinge mechanism 12, where the second shaft 30 as a second axis starts rotating after the first shaft 28 as a first axis rotates up to a rotation end position. In this structure, it is assumed that the first shaft 28 rotates from the 0-degree position to the 180-degree position, and the second shaft 30 rotates from the 180-degree position to the 360-degree position. This enables the display part 14 to be coupled from the 0-degree position up to the 360-degree position relative to the main body part 16 even in the simple structure. In addition, since the rotation of the first shaft 28 is switched to the rotation of the second shaft 30 with the 180-degree position as a boundary, the slide members 38 and 54 (82) for driving the upper leg portions 24 and the lower leg portions 50 (80) can be moved smoothly by means of the hinge mechanism 12.

The advance/retreat structure of the upper leg portions 24 and the lower leg portions 50 (80) may be of course any structure other than that using the slide members 38 and 54

(82), the upper base member 42, and the lower base member 56 mentioned above. Further, such a structure that the rotational movement of the display part 14 is detected by an angle sensor, not shown, to drive an electric motor, not shown, according to the detection results in order to advance/retreat the upper leg portions 24 and/or the lower leg portions 50 (80) may be used.

While embodiments have been described above in conjunction with the specific embodiments shown in the accompanying drawings, this is non limiting, and any configuration known to date can be adopted as long as it produces the effects described herein.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure for various embodiments with various modifications as are suited to the particular use contemplated.

Although illustrative embodiments have been described herein with reference to the accompanying drawings, it is to be understood that the embodiments are not limited to those particular descriptions, and that various other changes and modifications may be affected therein by one skilled in the art without departing from the scope or spirit of the disclosure.

What is claimed is:

1. An electronic device comprising:
   a main body part having an upper face and a lower face, the upper face comprising: a keyboard;
   a display part having a display;
   a hinge mechanism connecting said main body part to said display part;
   said main body part and said display part configured to rotate from a 0-degree position where said display and said keyboard face each other to a 360-degree position where back faces of said display and said keyboard face each other through a 180-degree position where said display and said keyboard are parallel with each other while facing an identical direction; and
   a leg portion that protrudes/retracts from said upper face or said lower face of said main body part in response to rotational movement of said display part from the 180-degree position to the 360-degree position relative to said main body part.

2. The electronic device according to claim 1, wherein upon rotation of said display part to the 180-degree position from the 0-degree position relative to said main body part, said leg portion is in a position to sink into said upper face of said main body part in response to the rotational movement.

3. The electronic device according to claim 1, wherein upon rotation of said display part from the 180-degree position to the 360-degree position relative to said main body part, said leg portion is in a position to protrude from said upper face of said main body part in response to the rotational movement.

4. The electronic device according to claim 1, further comprising an upper base member provided to support a proximal end of said leg portion to push and pull said leg portion in and out of said main body part.

5. The electronic device according to claim 4, wherein upon rotation of said display part to the 180-degree position from the 0-degree position relative to said main body part, said upper base member is influenced by an elastic member so as to keep the leg portion in a position where the leg portion sinks into an opening provided in the upper face of the main body part.

6. The electronic device according to claim 4, wherein upon rotation of said display part from the 180-degree position to the 360-degree position relative to said main body part, said upper base member moves against the influencing force of said elastic member to make the leg portion protrude from the opening.

7. The electronic device according to claim 1, wherein upon rotation of said display part from the 180-degree position to the 360-degree position, said slide member inside said main body part moves in a front-to-rear direction relative to a main body housing of said main body part;
   wherein a pressing side inclined face inclined in the moving direction of said slide member is provided in said slide member; and
   a receiving side inclined face inclined in a direction to face said pressing side inclined face is provided in said upper base member in a manner to be able to slidingly contact the pressing side inclined face.

8. The electronic device according to claim 1, wherein upon rotation of said display part to the 180-degree position from the 0-degree position relative to said main body part, said leg portion is in a position to protrude out of said lower face of said main body part.

9. The electronic device according to claim 8, wherein upon rotation of said display part from the 180-degree position to the 360-degree position relative to said main body part, said leg portion is in a position to retreat into said lower face of said main body part.

10. The electronic device according to claim 1, further comprising a lower base member provided to support a proximal end of said leg portion in a manner to be able to be advanced/retreated inside said main body part.

11. The electronic device according to claim 10, wherein upon rotation of said display part to a 180-degree position from the 0-degree position relative to said main body part, said lower base member is influenced by the force of said elastic member so as to make the leg portion protrude from the opening in the lower face of the main body part.

12. The electronic device according to claim 10, wherein upon rotation of said display part from the 180-degree position to the 360-degree position relative to said main body part, said lower base member moves against the force of said elastic member to make the leg portion sink into the opening in the lower face of the main body part.

13. A hinge mechanism comprising;
   a hinge case;
   a link pin;
   a biaxial structure containing a first shaft and second shaft; and
   a protruding stopper piece;
   wherein the first shaft rotates from a 0-degree position to a 180-degree position;
   wherein the second shaft rotates from the 180-degree position to a 360-degree position;
   wherein said second shaft starts rotating only after said first shaft rotates to a rotational end position at the protruding stopper piece;
   wherein said hinge case rotates along with rotational movement of a display part from the 180-degree position to the 360-degree position relative to a main body part; and
   wherein a slide member has an engaging recessed portion engaged with the link pin provided in the hinge case of said hinge mechanism.

* * * * *